US006734593B2

United States Patent
Lawes

(10) Patent No.: US 6,734,593 B2
(45) Date of Patent: May 11, 2004

(54) ALTERNATING CURRENT GENERATOR WITH UNPOLARIZED ROTOR

(76) Inventor: Roland C. Lawes, Apto 354, Santiago Veraguas, Panama, CA (US)

( * ) Notice: Subject to any disclaimer, the term of this patent is extended or adjusted under 35 U.S.C. 154(b) by 429 days.

(21) Appl. No.: 09/779,930

(22) Filed: Feb. 9, 2001

(65) Prior Publication Data

US 2003/0173846 A1 Sep. 18, 2003

(51) Int. Cl.$^7$ .................................................. H02K 3/00
(52) U.S. Cl. ........................................ 310/165; 336/120
(58) Field of Search .................................. 310/165, 254, 310/257, 261, 264, 268; 336/120; 335/78, 181, 182, 229; 363/106–107; 290/38 B, 38 R

(56) References Cited

U.S. PATENT DOCUMENTS 4,612,503 A * 9/1986 Shimizu et al. ........ 324/207.18
4,982,123 A * 1/1991 Raad ........................ 310/68 D
4,985,795 A * 1/1991 Gooch ........................ 360/115

* cited by examiner

Primary Examiner—Tran Nguyen
(74) Attorney, Agent, or Firm—George A. Bode; Robert T. Vorhoff; Bode & Associates

(57) ABSTRACT

An alternating current generator, comprising: a disc shaped rotor and first and second ring shaped stationary cores, coaxially located with the rotor, the rotor further comprising a non-magnetic disc attached to a shaft, with a plurality of low permeability magnetic blocks fastened to the rim of the disc; the first stationary core being an electromagnet shaped so as to present magnetic poles to the rotor blocks; and, the second stationary core being an armature, further comprising: a low permeability magnetic core wound with a conductive coil, shaped so as to present poles which can be magnetically polarized to the rotor blocks.

8 Claims, 5 Drawing Sheets

ALTERNATING CURRENT GENERATOR WITH UNPOLARIZED ROTOR

BACKGROUND OF THE INVENTION

1. Field of the Invention

The present invention relates to an alternating current generator having neither a rotating field nor a rotating armature. The rotating element, or rotor, is comprised of a number of core sections common to the cores of both exciter field and armature. The rotor has no rotating poles and there are no rotating coils.

2. General Background

Rotating electromagnetic alternating current generators depend for their production of electricity on the principal that a coil of conducting wire will have a current induced in its windings when the coil is subjected to a varying magnetic field, and that magnetic substances, such as iron, are capable of concentrating the magnetic flux surrounding the coil. By rotating coils in magnetic fields, or by rotating magnets in proximity to coils, the consequent variance of magnetism relative to the coils can be obtained.

Most alternating current (AC) generators now used for the production and transmission of electrical power for general use have a constant frequency (the rotor turns at a controlled rotational velocity) and a constant output voltage. They are of the type that utilizes a rotating magnetic field, produced by a regulated current through rotating coils to induce the desired current in a group of armature coils. Electromagnets are arranged on a rotor so that the poles facing the cores of the armature are alternately north and south. When the rotor is turned, the poles pass the armature cores, reversing the magnetic flux presented to them with the passing of each north-south pair, and so inducing an alternating electric current in the armature coils. The windings of the rotating exciter are led to a pair of slip rings, allowing a regulated current to enter and exit by means of brush contact with the slip rings. The amount of current through the rotating coils determines the strength of the exciter magnets, which in turn determines the voltage amplitude of the output.

Production of electrical power where neither voltage nor frequency control is important can usually be accomplished economically by a magneto, which uses permanent magnets about the rotor instead of electromagnets. The current is induced in the same manner as above, but the field strength of the permanent magnets is constant so that the voltage control has to be accomplished by varying the output resistance of the load. Its primary use is as a generator of ignition sparks, or for charging batteries after rectification to direct current.

When the output requires a controlled voltage but frequency is not important, another type of generator, similar to a magneto, is used. This type also induces current in an armature by passing alternate magnetic poles in proximity to magnetic cores, but the poles are aligned with the axle, and staggered so as to change the magnetic path through the armature cores. The rotating field magnet has a section concentric with the shaft that turns within a fixed coil so that no brushes are needed. Means of supporting this inner fixed coil presents a problem for resolution of which a multitude of designs have been proposed. Commonly known as an alternator, this type of generator is mainly used on vehicles, where it charges storage batteries after being rectified to direct current.

Several devices relating to alternating current generators have been patented.

U.S. Pat. No. 3,418,506, by Parker, discloses an axial airgap generator having a plurality of rotor and stator sections spaced from one another and mounted on a central shaft, wherein at least one of the stator sections carries windings for generating a magnetomotive force, and the rotors are surrounded by electrical conductors such as coil windings leading to slip rings.

U.S. Pat. No. 4,506,180, by Shizuka, et al., discloses a fixed field inductor-type generator wherein a fixed coil is mounted around a pair of pawl-like magnetic poles mounted on a rotary shaft.

U.S. Pat. No. 5,864,198, by Pinkerton, discloses a brushless generator wherein rotating coils pass through stationary electromagnetic fields to induce AC current in the coils, which is in turn used by a set of rotating electromagnets to induce an AC voltage in a second set of coils.

Other devices disclosed in U.S. Pat. Nos. 3,569,804; 3,571,639; 3,610,979; 4,041,340; 4,075,519; and 4,611,139 are representative of the state of the art, however an alternating current generator has not been previously proposed wherein the rotor has no rotating coils and no rotating poles.

SUMMARY OF THE PRESENT INVENTION

It is an object of the present invention to provide an electromagnetic alternating current generator having neither a rotating field nor a rotating armature, comprised of a shaft mounted non-magnetic disc with blocks made of a suitable magnetic material having low permeability fastened to its rim, and two stationary cores, the first being electromagnetic exciter core, and the second being an armature capable of being magnetized. When the rotor is caused to rotate by a driver engine, the blocks pass in close proximity to the poles of the stationary cores. As the blocks reach a first position, they complete a magnetic circuit between the electromagnet of the exciter core and the armature, thereby producing magnetic flux in the armature core. As the blocks reach a second position, the circuit is broken, dropping the magnetic flux in the armature to zero, which induces a current in a solenoid type wire wound around a section of the core. When the blocks reach a third position, they again complete a magnetic circuit, but with opposite poles of the electromagnet. This reverses the magnetic flux in the armature core, again inducing a current, but with opposite polarity, thus generating alternating current.

BRIEF DESCRIPTION OF THE DRAWING

For a further understanding of the present invention, reference should be had to the following description taken in conjunction with the accompanying drawing in which like parts are given reference numerals and, wherein:

FIG. 2B shows details of the windings of the armature;

FIG. 4B shows details of a block-to-disc fastening;

DETAILED DESCRIPTION OF THE PREFERRED EMBODIMENT

Figure 1:
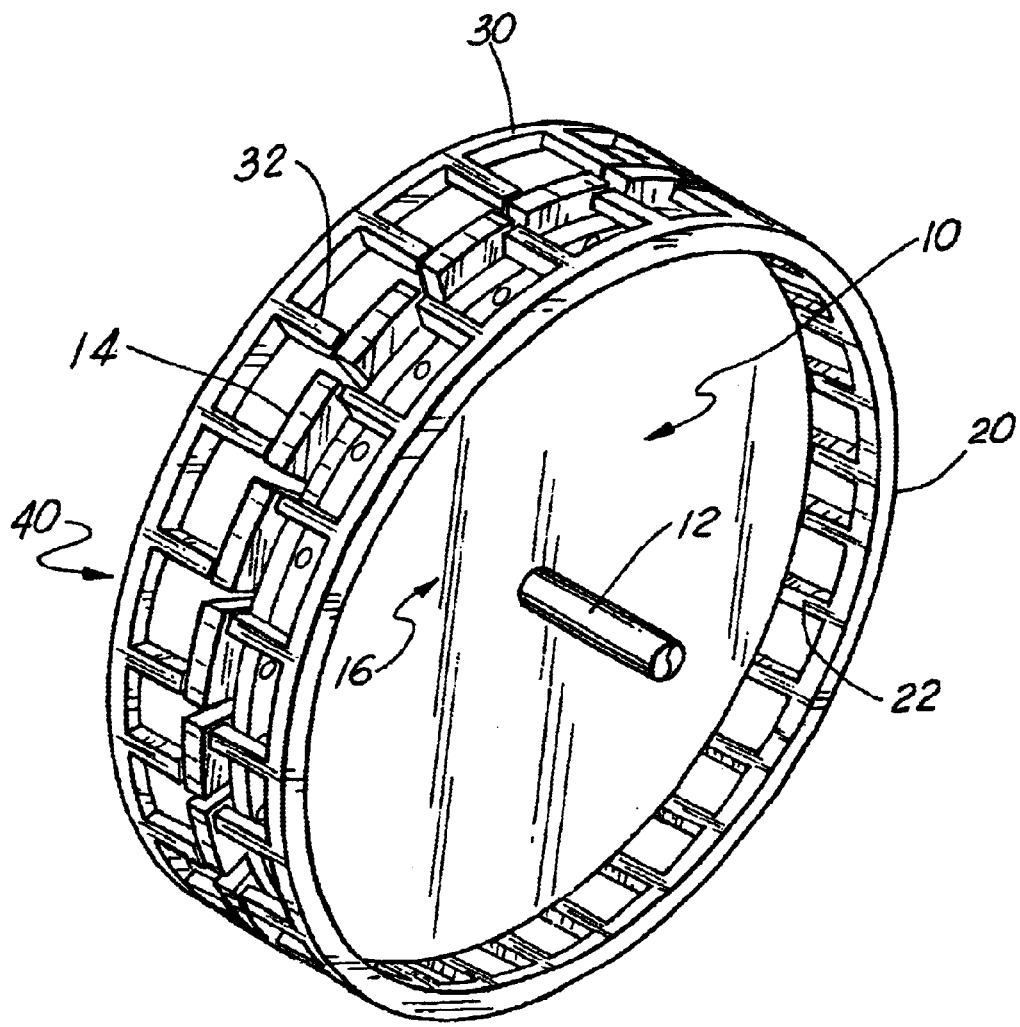
FIG. 1 is a perspective view of the alternating current generator of the present invention prior to the installation of windings.
Figure 2A:
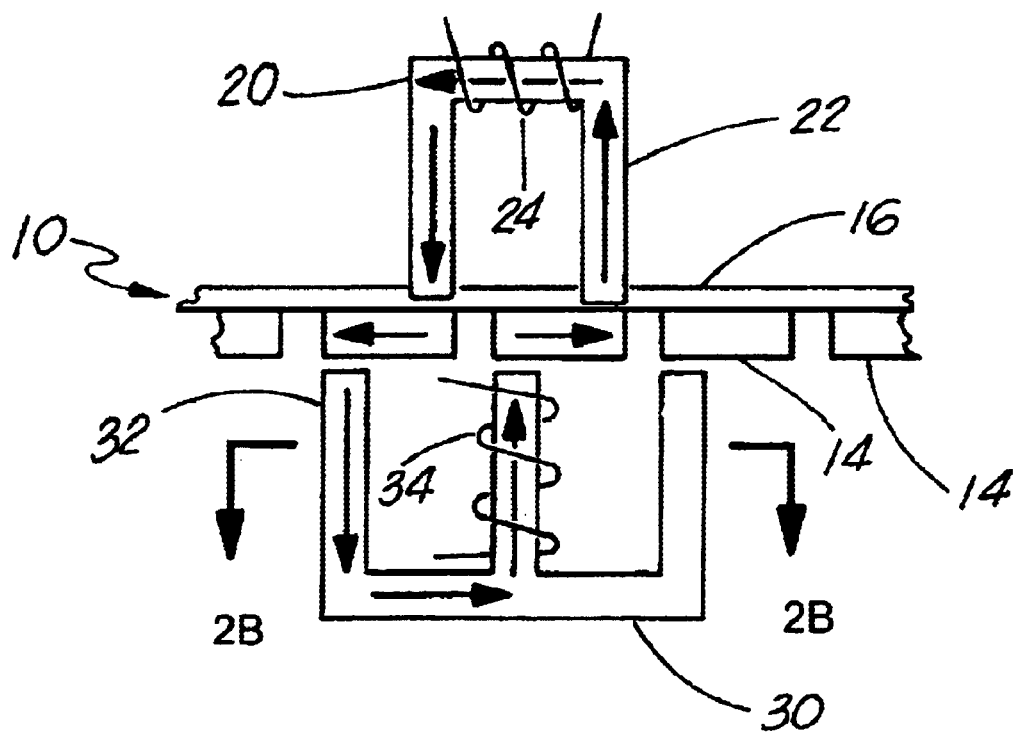
FIGS. 2A and 2B are diagrammatic illustrations depicting the fundamental principles of the present invention at a first point or instant in time; more particularly, depicting the relationship of moving parts to stationary parts at a first point in time, and, where
Figure 2B:
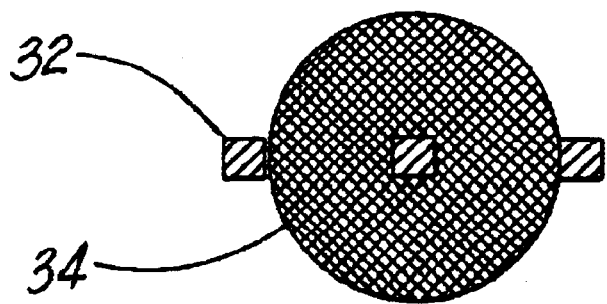

Referring now to the drawings, and in particular FIGS. 1 and 2, the alternating current generator of the present invention is designated generally by the numeral 40. Alternating current generator 40 is comprised of a rotor 10, an exciter core 20, and an armature 30.

The rotor 10 is further comprised of a non-magnetic disc 16 fastened to a shaft 12, with a plurality of blocks 14, preferably laminated, made of suitable magnetic material having low permeability, such as iron, fastened to the rim of the disc 16.

Referring now to FIG. 2, the exciter core 20 is an electromagnet, preferably laminated, further comprised of a core of suitable magnetic material having low permeability, such as iron, shaped so as to present magnetic poles 22 to the rotor blocks 14, and a solenoid type coil 24, wound with insulated wire, of any conductive material capable of carrying an electric current, about a section of the core 20.

The armature 30 is further comprised of a core, preferably laminated, of a suitable magnetic material having low permeability, such as iron, shaped so as to present surfaces 32, which can be magnetically polarized, to the rotor blocks 14, and a solenoid type coil 34, wound with insulated wire, of any conductive material capable of carrying an electric current, about a section of the core 30.

In operation, the rotor 10 is caused to rotate by a driver engine. The blocks 14 pass in close proximity to the poles of the exciter core 22 and the armature 32. FIG. 2 shows the position of the rotor blocks 14 at a first point of time. The arrows illustrate the direction of magnetic flux when a direct current (DC) source is applied to the electromagnet coil 24.

Figure 3:
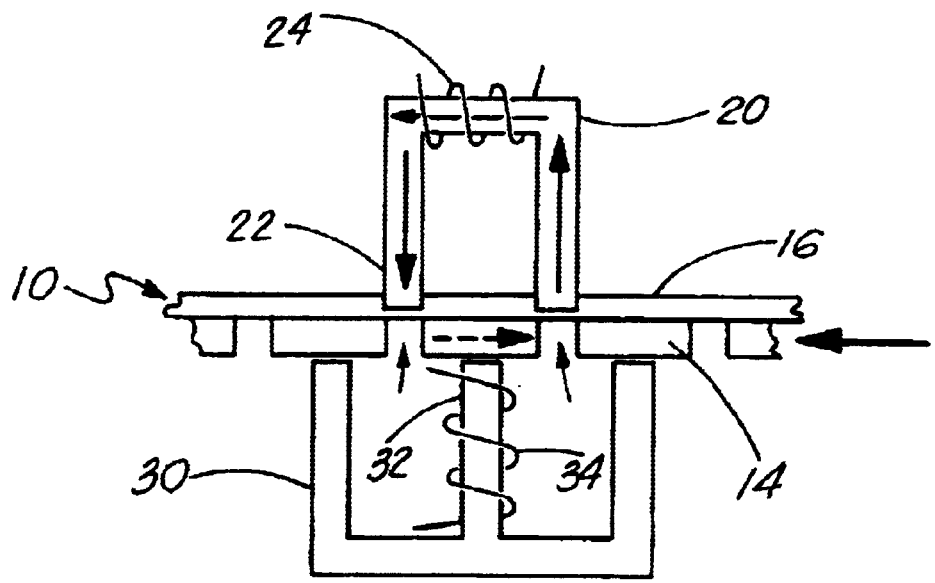
FIG. 3 is a diagrammatic illustration depicting the fundamental principles of the present invention at a second point in time; more particularly, depicting the relationship of moving parts to stationary parts at a second point in time.
Figure 4A:
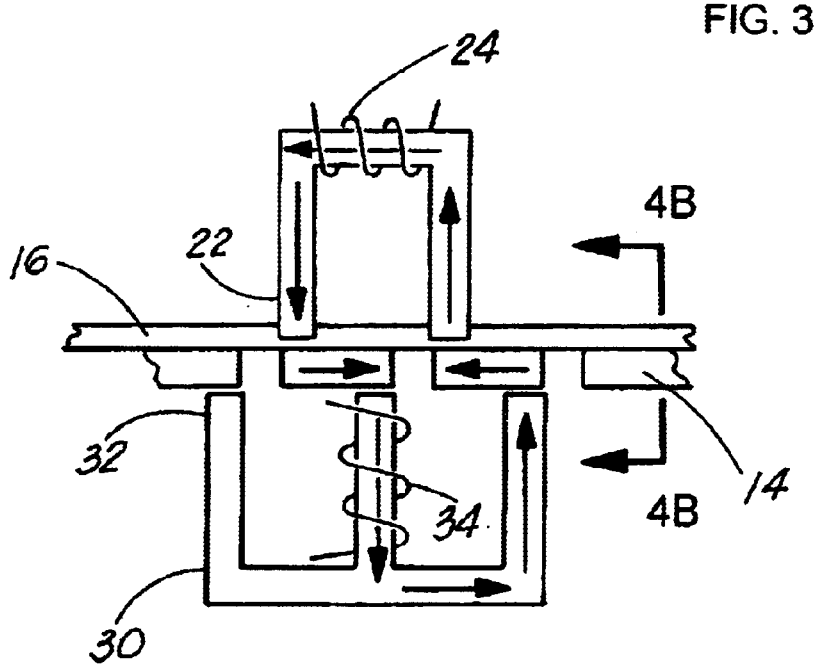
FIGS. 4A and 4B are diagrammatic illustrations depicting the fundamental principles of the present invention at a third point in time; more particularly, depicting the relationship of moving parts to stationary parts at a third point in time, and, where
Figure 4B:
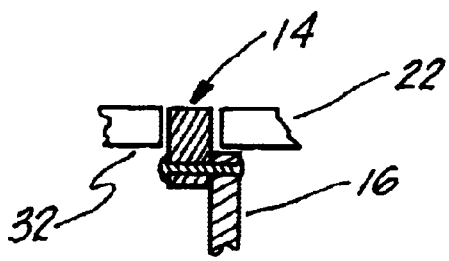
Figure 5:
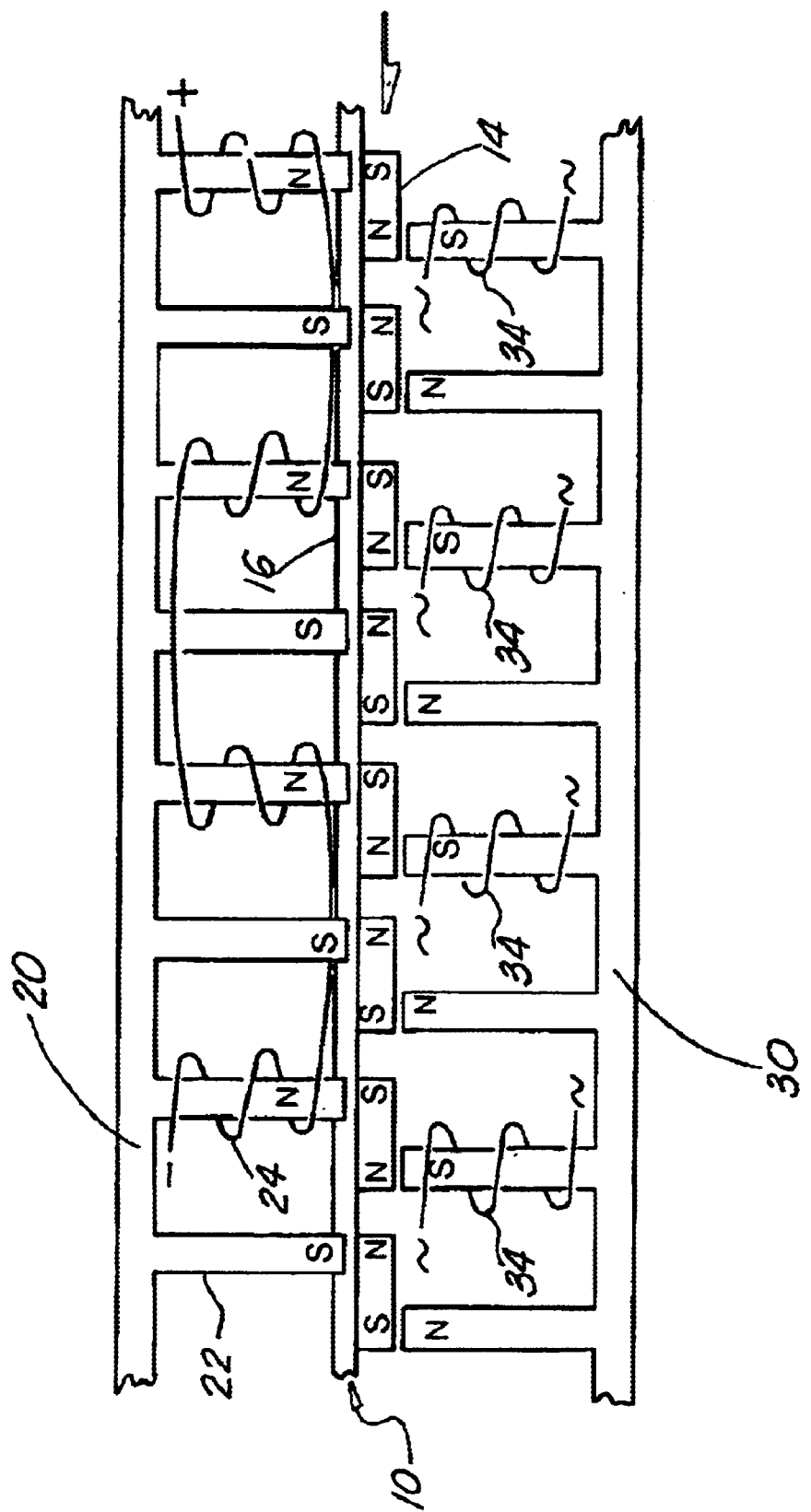
FIG. 5 diagrammatically illustrates how exciter cores and armatures my be ganged along the periphery of the rotor to induce additional output from a single rotor.
Figure 6A:
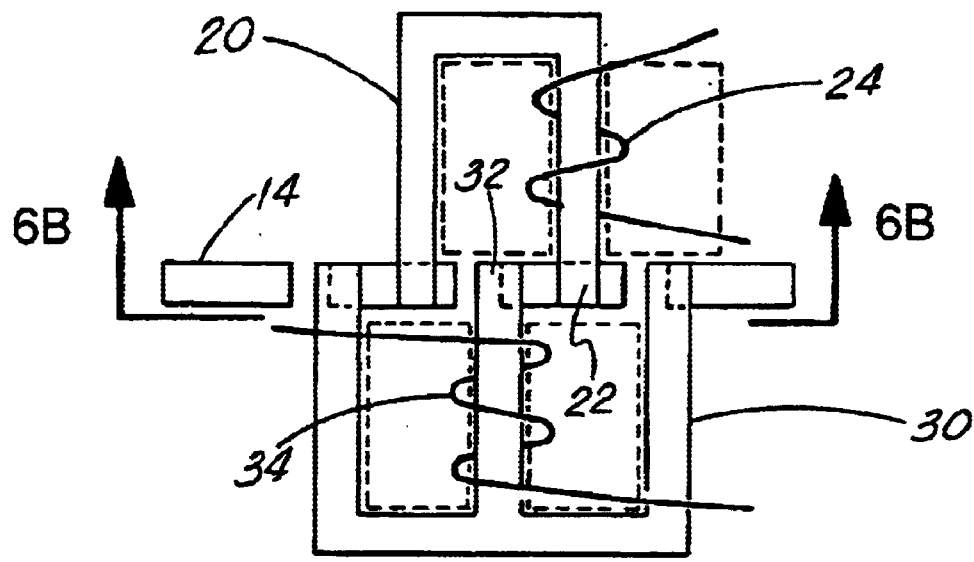
FIGS. 6A and 6B diagrammatically illustrate how the elements of the present invention can be rearranged so that the magnetic attraction is radial rather than axial.
Figure 6B:
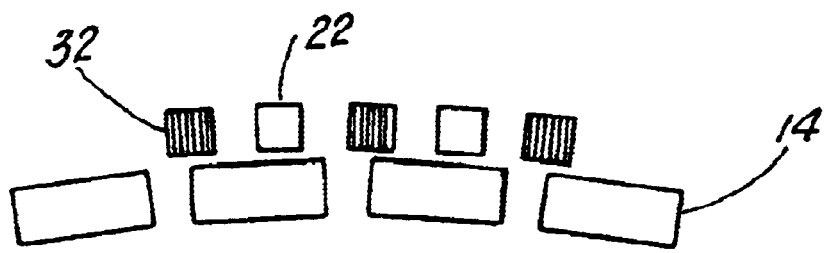

As the rotor 10 moves the blocks 14 to the position shown in FIG. 3, the magnetic flux which was concentrated in armature core 30 changes from its maximum gauss in FIG. 2 to zero in FIG. 3, inducing a current in armature coil 34. The rotor 10 continues to rotate to the position shown in FIG. 4, causing the flux once again to increase, again inducing a current in armature coil 34. However, the flux lines concentrated in the armature core 30 have changed direction, causing the induced current to have an opposite polarity. Alternating current, so generated, is the output of the present invention.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An alternating current generator, comprising:
   (a) a disc-shaped rotor and first and second ring shaped stationary cores, coaxially located with said rotor;
   (b) said rotor further comprising a non-magnetic disc attached to a shaft, with a plurality of magnetic blocks made of a soft magnetic material with low permeability fastened to the rim of said disc;
   (c) said first stationary core being an electromagnet core and shaped so as to present magnetic poles to said rotor blocks; and,
   (d) said second stationary core being an armature, further comprising an armature magnetic core made of a soft magnetic material with low permeability, said armature core being wound with a conductive coil, shaped so as to present poles which can be magnetically polarized to said rotor blocks.

2. The generator of claim 1, wherein said poles of said stationary cores are positioned in intervening relation to each other such that opposing ends of said
   blocks can align alternately with said electromagnet and said armature so as to allow the transmission of magnetic flux from said electromagnet to said armature.

3. The generator of claim 2, wherein said blocks are iron.

4. The generator of claim 2, wherein said armature core is iron.

5. The generator of claim 2, wherein said blocks are laminated.

6. The generator of claim 2, wherein said armature core is laminated.

7. The generator of claim 2, wherein said conductive coil is copper.

8. An alternating current generator, comprising:
   (a) a disc shaped rotor and first and second ring shaped stationary cores, coaxially located with said rotor;
   (b) said rotor further comprising a non-magnetic disc attached to a shaft, with a plurality of laminated iron blocks fastened to the rim of said disc;
   (c) said first stationary core being an electromagnet core and shaped so as to present magnetic poles to said rotor blocks;
   (d) said second stationary core being an armature, further comprising a laminated iron core wound with a copper coil, shaped so as to present poles which can be magnetically polarized; and,
   (e) said poles of said stationary cores are positioned in intervening relation to each other such that opposing ends of said blocks can align alternately with said electromagnet and said armature so as to allow the transmission of magnetic flux from said electromagnet to said armature.

* * * * *